UNITED STATES PATENT OFFICE 2,134,903

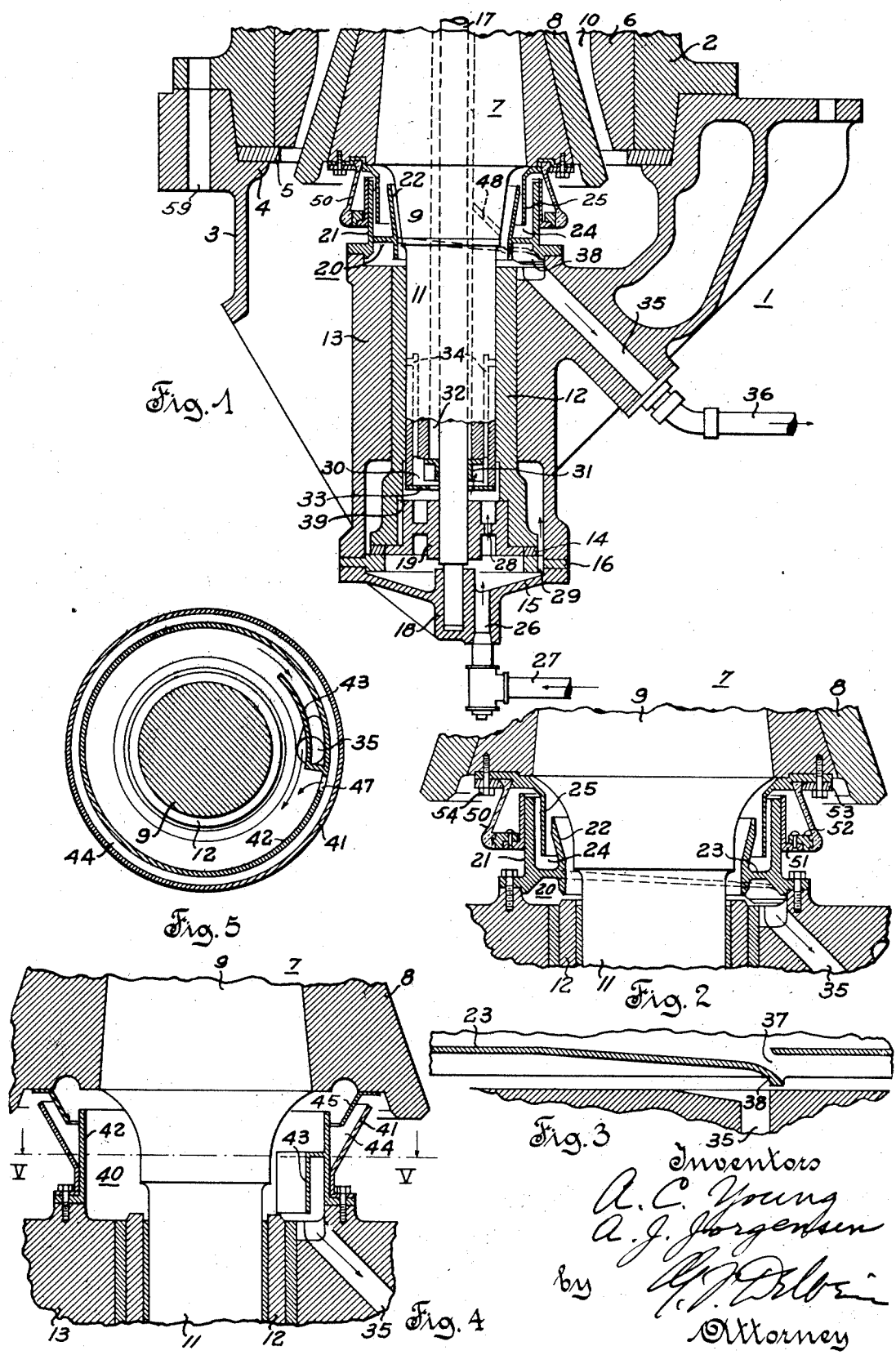

OIL BAFFLE ARRANGEMENT FOR GYRATORY CRUSHERS

Arthur C. Young, Milwaukee, and Arthur J. Jorgensen, Wauwatosa, Wis., assignors to Allis-Chalmers Manufacturing Company, Milwaukee, Wis., a corporation of Delaware Application September 7, 1934, Serial No. 743,030

9 Claims. (Cl. 83—10)

This invention relates in general to the art of lubrication and more particularly to apparatus for preventing the escape of lubricating medium from a rotary member.

The invention is particularly applicable to the prevention of the escape of lubricant from the upper end of a vertically disposed bearing such as the eccentric bearing of a gyratory crusher. The eccentric of one type of gyratory crusher rotates at a speed of 860 revolutions per minute and requires an average circulation of lubricating oil of eight to thirty gallons per minute. The rotation of the eccentric causes a revolving body of oil to be formed around the shaft of the crusher. This revolving body of oil does not rapidly discharge to the return passage of the lubricating system for recirculation, but tends to escape upward along the shaft if means are not provided to confine it. The escape of this oil is to the detriment of economy, to the detriment of products being crushed, and also to the detriment of rubber shields used in excluding dust from the eccentric and its lubricant.

Because of the compound motion of the gyratory crusher shaft, it is difficult to prevent the escape of oil from the eccentric bearing as packing glands and other well known means for this purpose cannot be utilized effectively.

It is, accordingly, the principal object of this invention to provide effective means for preventing the escape of lubricant from a rotary member having a compound motion.

A more general object of the invention is to provide means for preventing the escape of lubricant from the upper end of a vertically disposed shaft bearing.

Another object of the invention is to provide an oil baffle system for preventing the escape of oil from the bearing of a vertically disposed movable member capable of rotary, gyratory and longitudinal motions.

A more specific object of the invention is to provide an oil baffle system for a gyratory crusher driving mechanism that is adapted to prevent the escape of oil upwardly along the crusher shaft.

A further object of the invention is to provide means for effectively withdrawing oil from a rotating body thereof.

It is another object of the invention to provide an oil baffle arrangement in a gyratory crusher permitting the utilization of a rubber curtain as a portion of a dust seal connected in fluid tight relation to the crushing head and to the outer member of the bearing.

According to the present invention, the head of a gyratory crusher is provided with a depending oil baffle that extends between the two upstanding walls of an oil receiving chamber mounted on the top of the eccentric bearing. The baffle intercepts oil which escapes upward along the crusher shaft and delivers it to the oil receiving chamber. Means are provided in the oil chamber structure for returning the collected oil to the circulating system and for engaging the oil body which may be rotating on the top of the crusher eccentric in order to guide oil from it into the circulating system.

Other objects and advantages of this invention will become apparent upon a full consideration of this specification and the accompanying drawing forming a part hereof on which like reference numerals designate like or corresponding parts throughout the various views.

Fig. 1 is a fragmentary view in longitudinal, central section of a gyratory crusher utilizing an oil baffle arrangement that embodies the invention;

Fig. 2 is an enlarged fragmentary sectional view corresponding to Fig. 1 showing the oil baffle in greater detail;

Fig. 3 is a fragmentary view showing a development of a portion of the interrupted annular bottom of the oil baffle casing;

Fig. 4 is a fragmentary sectional view corresponding to Fig. 2, but showing a modification of the oil baffle arrangement; and Fig. 5 is a view in horizontal section taken on the plane represented by the line V—V of Fig. 4 and looking in the direction of the arrows.

Referring more particularly to Fig. 1 of the drawing, the structure embodying the invention is shown associated with a gyratory crusher 1 comprising in general a top shell 2 and a bottom shell 3 connected by suitable bolts (not shown) passing through the alined bores 59 shown at the left. Within the top shell 2 is mounted a concave 6 that cooperates with a gyrating member 7 to form a crushing chamber 10. The bottom shell 3 is provided with an inwardly extending ledge 4 on which is positioned a wearing ring 5 projecting inwardly so as to provide a support for the concave 6. The gyrating member 7 comprises a conical head 8 mounted on the tapered intermediate portion of a main shaft 9, the outer surface of the head 8 being shaped to cooperate with the inner annular surface of the concave 6 to provide therebetween the crushing chamber 10.

The main shaft 9 is provided with a lower cylindrical portion 11 that is received within the eccentric cylindrical bore or opening in an eccentric sleeve 12 for the purpose of gyrating the member 7. The eccentric sleeve 12 is arranged to rotate within the cylindrical surface of a hub 13 formed in the bottom shell 3 whose lower inner surface is of increased diameter to receive an outwardly flared lower portion of the eccentric. It is to be understood that the gyratory crusher, although only partially illustrated in Fig. 1, includes a suitable bearing for confining and adjustably supporting the upper end of its main shaft 9 in well known manner. A thrust bearing including a wearing plate 14 engages the lower end of the eccentric 12 and is supported, through the intermediary of a rabbeted plate 16, by a bottom plate 15, both rigidly secured to the adjacent lower end of the eccentric hub by suitable means.

The means for driving the eccentric includes a drive shaft 17 extending through the hollow main shaft 9 of the gyrating member 7. The lower end of the drive shaft 17 is reduced and is received within a bearing 18 provided in the bottom plate 15. The driving connection between the drive shaft 17 and the eccentric 12 comprises a driving plate 19 which is connected at its hub portion to the drive shaft and at its outer cylindrical surface to the eccentric 12.

To insure satisfactory operation of a gyratory crusher, it is necessary to provide a continuous liberal flow of lubricating oil through the eccentric driving mechanism while the crusher is in operation. The lubricating oil which flows over the top of the eccentric driving mechanism is caused to rotate by the eccentric and may escape upward along the shaft 9 to the crushing head 8 from which it is thrown outward into the material being crushed unless means are provided for confining it. According to the present invention, the oil is confined and prevented from escaping by an oil baffle system. The oil baffle arrangement which embodies the present invention, includes a casing 20 that is secured in fluid tight relation to the upper surface of the hub 13. The casing 20 terminates at its upper end adjacent to the bottom of the head 8, when the head is in its low position, and surrounds the portion of the gyratory member extending between the bottom surface of the head 8 and the top surface of the eccentric sleeve 12. The hub 13 and casing 20 taken together may conveniently be considered as providing a continuous wall surrounding the eccentric 12 and the portion of the main shaft 9 extending from the head 8 to the lower end of the shaft.

As shown, the casing 20 comprises a vertical annular outer wall portion 21 and a radially spaced annular inner wall portion 22. The outer portion 21 of the radially spaced vertical annular portions 21 and 22 may be considered as constituting a part of the above described surrounding wall. The inner portion 22 cooperates with the outer portion 21 and with a connecting horizontal web portion 23 to provide an annular oil receiving chamber 24. The oil receiving chamber 24 cooperates with an annular baffle plate 25 depending from the bottom surface of the head 8 and projecting into the chamber. The chamber 24 and the baffle plate 25 cooperate to effectively prevent the escape of oil which may pass upward from the surface of the eccentric along the extending portion of the main shaft to the circular line of attachment of the baffle plate to the head.

In the gyratory crusher shown, an upward feeding of lubricating oil to the eccentric 12 is provided, but it is to be understood that the oil baffle arrangement embodying the invention is not limited in its application to such direction of feeding of lubricating oil, but may equally well be used for limited pressure, down-flow oiling of the eccentric. To accomplish upward feeding of lubricating oil, the crusher is provided in its bottom plate 15 with an oil inlet passage 26 to which a pipe line 27 from an oil source at a predetermined pressure may be connected. An aperture 28 is provided in the driving plate 19 to admit oil to the inner surface of the eccentric 12, and an aperture 29 is provided in the wearing plate 16 to admit oil into an annular gap between the inner surface at the lower end of the eccentric hub 13 and the flared outer surface of the eccentric 12 surrounded thereby for the lubrication of the external surface of the eccentric 12. In addition to admitting oil to the bottom of the eccentric, it is desirable to supply relatively cool oil at a point well along the inner surface of the eccentric 12, and for this purpose longitudinal passages are provided in the main shaft 9 communicating with the inner surface of the eccentric 12.

To prevent the escape of oil into the clearance space or cavity 32 between the drive shaft 17 and the gyrating main shaft 9, the main shaft is provided at its lower end with a cup-shaped recess 30 for the reception of a sliding or floating member 31 circumferentially sealing with the drive shaft 17 and sealing with the reduced lower end of the main shaft through a spherical surface in the floating member 31 that engages a complementary spherical surface on the end of the shaft. The head of leakage oil forming in the cavity 32 is controlled by a duct 48 that discharges on to the eccentric 12. A disk 33 secured to the lower end of the main shaft provides a rest for the floating member 31 when no oil pressure exists at the inlet passage 26. When oil under pressure is introduced through the passage 26, the oil passes upward through an aperture in the disk 33 and lifts the floating member 31 into engagement with the lower end of the main shaft. The main shaft is provided with circumferentially spaced, longitudinal ducts 34 which conduct oil from adjacent to the floating member 31 directly to the inner surface of the eccentric, at points well along its length.

The upward feeding of lubricating oil to the inner surface of the eccentric and simultaneously to the outer surface of the eccentric necessarily results in the escape of a considerable quantity of oil onto the upper surface of the eccentric where it is churned around and builds up a rotating body of oil in the annular chamber beneath the horizontal connecting portion 23 of the casing 20. This rotating oil body has little tendency to escape into the outlet passage 35 formed in the bottom shell for its reception to return it for recirculation through the connection 36 to the source of oil supply.

The annular web portion 23 connecting the inner and outer wall portions 21 and 22 of casing 20 and forming the bottom of the chamber 24 is circumferentially interrupted to provide a drain or discharge opening 37 for permitting the oil that may accumulate in the chamber 24 to pass into the outlet passage 35 in the bottom shell 3. As more clearly shown in the development of Fig. 3, part of the interrupted annular web portion 23 is inclined downward and formed at its terminus with an abrupt downward curvature providing a lip 38. This lip 38 overhangs the mouth of the outlet passage 35 and cooperates with the inclined part of the annular web portion 23 to effect discharge of the revolving oil body beneath the annular portion 23 into the outlet passage 35. This discharge is effected since the inclined part of the annular portion 23 and lip 38 thereof together with the adjacent surface of the eccentric hub 13 tend to change the velocity head of the rotating oil body into pressure head thus facilitating the flow of a large portion of the rotating oil body into the outlet passage 35 overhung by the lip 38. The portion of this whirling body of oil which passes between the lip 38 and the adjacent surface of the eccentric hub provides a desired suction action at the drain opening 37 and thus facilitates removal of the oil from the oil receiving chamber 24 through the drain 37. If a whirling body of oil of appreciable height should exist, notwithstanding the suppressing action of the inclined part of the annular portion 23, whatever oil might reach the upper portion of the inner wall portion 22 would positively be confined by the annular baffle plate 25. The path of travel of any oil which may pass up the shaft 9 is thus finally interrupted by the baffle plate 25 and, since the baffle plate projects into the chamber 24, it positively prevents any oil from escaping outwardly beyond the outer wall portion 21.

Since outward escape of any oil is positively prevented by the baffle plate 25 and cooperating chamber 24 of the oil baffle arrangement, the outer wall portion 21 may conveniently be provided with a cylindrical surface for the reception of a sleeve ring 51 of a composite dust shield that includes a rubber curtain 50 connected at its lower end through the intermediary of a member 52 to the sleeve ring. The sleeve ring 51 is made sufficiently high to extend almost to the lower surface of the gyratory head 8 and forms a slidable extension upon the outer wall portion 21 that functions to prevent oil splashing over the top of the wall 21 when the crushing head is in elevated position. The rubber curtain of the composite dust shield is permanently secured at its upper end in fluid tight relation to the head 8 by a clamp ring 53 engaging the curtain and secured to the head by bolts 54. The composite dust shield is fully disclosed and claimed in copending applications of Ray C. Newhouse and George F. DeWein, filed August 25, 1934, Serial No. 741,404, and M. R. Hull, B. S. Morrow and W. H. Casto, Serial No. 593,316, filed February 16, 1932.

Fig. 4 shows a modified form of the oil baffle arrangement. In the baffle arrangement of this figure, a casing 40 is mounted in fluid tight relation on the upper surface of the hub 13 in a manner similar to the mounting of the casing 20 shown in Figures 1 and 2. The casing 40 provides an inclined outer wall portion 41 and a cylindrical inner wall portion 42 joined to provide a closed bottom oil receiving chamber 44 similar in function to the oil receiving chamber 24 of the modification shown in Figs. 1 and 2. A depending baffle plate 45 secured to the head 8 is preferably inclined to correspond to the inclination of the outer wall portion 41 in order to more effectively deflect and retain any oil which might otherwise tend to escape along the main shaft 9 beyond the point of attachment of the baffle plate 45. Means are provided on the inner surface of the wall portion 42 for urging the oil body which collects on the upper surface of the eccentric 12 into the outlet passage 35, in the form of a scoop 43 open at the side which faces the oncoming whirling or rotating body of oil, and also open at its bottom which overlies the mouth of the outlet passage 35, as clearly indicated in Fig. 5. The inner wall portion 42 is provided with a drain aperture 47 for the oil chamber 44 at a point adjacent to the closed end of the scoop 43 whereat the body of oil, whirling as indicated by the inner arrow in Fig. 5, provides suction action that assists in the proper evacuation of oil collected by the baffle plate 45 and received within the chamber 44. The scoop 43 is similar in action to the interrupted annular portion 23 of the casing of the oil baffle arrangement of Figs. 1, 2 and 3, in that it provides for reducing the height and quantity of the revolving oil body by changing the velocity head of the revolving oil body into pressure head, facilitating direct discharge into the outlet passage 35 of a considerable portion of this oil body. As illustrated more completely in Fig. 5, the upper terminus of the passage 35 in each of Figs. 1, 2 and 4 intercepts a tapered groove provided in the upper surface of the eccentric hub 13 for further assisting the escape of oil from the oil body into the outlet passage.

Each of the two disclosed arrangements of oil baffle provides for reducing the head and quantity of the revolving body of oil which tends to form upon the upper end of the rotary eccentric. Each of these arrangements further positively prevents the escape of any oil beyond the circumferential line determined by the attachment of the depending baffle plate to the head. Because of this function of the baffle plate, and as indicated in the arrangement of Fig. 1, a dust shield of rubber may be employed between the head 8 and one of the wall portions defining the receiving chamber without any danger of deterioration of the rubber shield by escaping oil.

It is to be understood that the invention is not limited to the precise construction shown and the mode of operation described, for various modifications thereof within the spirit and scope of the subjoined claims may occur to persons skilled in the art to which the invention appertains.

It is claimed and desired to secure by Letters Patent:

1. An oil baffle system for a vertically disposed shaft bearing, comprising a stationary baffle casing secured to the upper end of the bearing in concentric relation thereto, said baffle casing having an outer wall, a horizontal flange extending inwardly from said outer wall in vertically spaced relation to said bearing end and a stationary inner annular wall carried by said horizontal flange in spaced relation to said outer wall and depending nearly to the upper end of said bearing to define an annular oil receiving chamber below said horizontal flange and having a narrow annular opening for admitting oil thrown by centrifugal force and with whirling motion along the top of said bearing, an outlet for said chamber, and deflecting means on a wall of said chamber adjacent said outlet for directing said whirling oil into said outlet.

2. An oil baffle system for a vertically disposed bearing having an oil outlet passage communicating with its upper surface, comprising a baffle casing secured to the upper surface of the bearing in concentric relation thereto and enclosing said oil outlet passage, said casing having an outer wall, a horizontal flange projecting inwardly from said outer wall in spaced relation to the upper surface of the bearing and an inner wall carried by said horizontal flange in spaced relation to said outer wall and depending nearly to the upper surface of the bearing defining an annular chamber and leaving an annular space for permitting passage of oil thrown by centrifugal force along the top of the bearing into said annular chamber formed by said walls and said flange, and means on said horizontal flange for deflecting oil rotating within said annular chamber into said oil outlet passage.

3. An oil baffle system for the bearing of a vertically disposed eccentrically mounted shaft, comprising a casing secured to the upper end of the shaft bearing, said casing comprising an outer cylindrical wall, a horizontal flange extending inwardly from said outer wall at a position above said shaft bearing end and a stationary inner circular wall carried by said inwardly extending flange and extending upward therefrom to form therewith an oil collecting chamber and extending downward therefrom nearly to the upper end of said bearing to form an oil receiving chamber for receiving a whirling body of oil thrown by centrifugal force from said rotating shaft along the top of said bearing and beneath the lower edge of said inner circular wall, and means for engaging said whirling oil body to conduct oil therefrom.

4. A dust sealing system for the eccentric bearing of a gyratory crusher of the type having a vertically disposed shaft carried in an eccentric sleeve rotatably mounted in a stationary bearing, that comprises a baffle casing secured to the top of the stationary bearing, said casing having a cylindrical outer wall extending upwardly, a discontinuous horizontal flange vertically spaced from the top of said bearing and extending inwardly from said outer wall and a stationary inner wall carried by said horizontal flange and extending upwardly therefrom and downwardly therefrom nearly to the top of said bearing, said inner and outer walls and said horizontal flange forming an upper oil collecting chamber and a lower oil receiving chamber, said lower oil receiving chamber being arranged to receive whirling oil thrown by centrifugal force from the top of said eccentric sleeve, means to conduct oil from said lower oil receiving chamber, and an annular baffle plate carried by said shaft and depending throughout its circumference into said upper oil collecting chamber between said inner and said outer walls to divert oil thrown from said shaft into said upper oil collecting chamber on to said discontinuous flange from which it drains into said lower chamber to be conducted therefrom.

5. An oil baffle system and dust seal for the eccentric bearing of a gyratory crusher, said bearing having a passageway for withdrawing oil from the top thereof and said baffle system including a baffle casing secured to the upper end of the eccentric bearing, said baffle casing comprising an outer circular wall provided with an inwardly extending flange carrying an inner circular wall and forming above said flange an oil collecting chamber and below said flange a chamber for receiving a whirling body of oil thrown by centrifugal force from the top of the eccentric beneath the lower edge of said inner circular wall, said flange having a depending portion struck downward therefrom forming a passageway for draining oil from said upper oil collecting chamber into said lower chamber and forming a deflector to engage the whirling body of oil in said oil receiving chamber to direct said oil into said oil withdrawing passageway.

6. An oil confining baffle for a gyratory crusher having a vertically disposed bearing provided with an oil drain opening and having an eccentric sleeve rotatably mounted in said vertical bearing, comprising a baffle casing attached to the top of the bearing in concentric relation therewith, said casing having an inner wall and an outer wall the inner wall being carried by the outer wall by means of an interconnecting horizontal flange, said flange having a depending portion disposed to engage oil rotated by said eccentric to divert it into said oil drain opening and having an opening therethrough for draining oil from its upper surface, said casing constituting an upper oil collecting chamber and a lower oil receiving chamber, said lower chamber having an annular opening adjacent to the top of the bearing for receiving whirling oil thrown by centrifugal force from the top of said rotating eccentric sleeve to be diverted by said depending portion of said flange into said drain opening of said bearing.

7. In combination in a gyratory crusher, a high speed eccentric having an opening, a gyrating crushing part carried within said opening and extending upwardly beyond said opening, a wall surrounding said eccentric and part of the upwardly extending portion of said gyrating crushing part, means for conducting oil in a closed circuit longitudinally of said eccentric, said wall at said extending portion of the gyrating crushing part including spaced annular portions forming a chamber, a web connecting said spaced annular portions to form upper and lower compartments therein, a depending baffle secured to said gyrating crushing part and projecting downward into said upper compartment, said upper compartment being provided with a discharge opening in said web, and circumferentially downwardly directed baffle means adjacent said discharge opening and serving to provide for withdrawal of oil collecting in said upper compartment and for directing said oil into said lower compartment.

8. A combination according to claim 7 wherein said downwardly directed baffle means is arranged in proximity to a discharge conduit in said lower compartment, whereby said baffle means suppresses the tendency of the rotating body of oil in said lower compartment to rise beyond a given level and simultaneously lessens the quantity of oil in the upper compartment.

9. In combination in a gyratory crusher, a high speed eccentric having an opening, a gyrating crushing part carried within said opening and extending upwardly beyond said opening, a wall surrounding said eccentric and part of the upwardly extending portion of said gyrating crushing part, means for conducting oil in a closed circuit longitudinally of said eccentric, said wall at said extending portion of the gyrating crushing part including spaced annular portions, a web connecting said spaced annular portions to form upper and lower compartments, a depending baffle secured to said gyrating crushing part and projecting downward into said upper compartment, said upper compartment being provided with a discharge opening in said web, a second depending baffle extending circumferentially downward adjacent said opening and extending beneath said upper compartment, and serving to provide for withdrawal of oil collecting in said upper compartment and for directing said oil into said lower compartment, and a rubber dust seal extending between the said gyrating part and one of said annular portions surrounding the extending portions of the gyrating crushing part.

ARTHUR C. YOUNG.
ARTHUR J. JORGENSEN.